(12) United States Patent
Berg

(10) Patent No.: US 7,330,790 B2
(45) Date of Patent: Feb. 12, 2008

(54) METHOD OF SEISMO ELECTROMAGNETIC DETECTING OF HYDROCARBON DEPOSITS

(75) Inventor: Andrey Berg, S. Diego, CA (US)

(73) Assignee: Seismic Sciences, Inc., Green Bay, WI (US)

( * ) Notice: Subject to any disclaimer, the term of this patent is extended or adjusted under 35 U.S.C. 154(b) by 4 days.

(21) Appl. No.: 11/241,643

(22) Filed: Oct. 3, 2005

(65) Prior Publication Data

US 2007/0078603 A1    Apr. 5, 2007

(51) Int. Cl.
*G01V 11/00* (2006.01)
*G01V 1/40* (2006.01)
*G01V 3/18* (2006.01)

(52) U.S. Cl. .......................................... 702/13; 702/14
(58) Field of Classification Search ................... 702/12, 702/13, 14, 17, 18
See application file for complete search history.

(56) References Cited

U.S. PATENT DOCUMENTS

| 4,904,942 | A  | * | 2/1990  | Thompson        | 324/323 |
|-----------|----|---|---------|-----------------|---------|
| 5,486,764 | A  | * | 1/1996  | Thompson et al. | 324/323 |
| 6,462,549 | B1 | * | 10/2002 | Curtis et al.   | 324/323 |
| 6,664,788 | B2 | * | 12/2003 | Hornbostel et al.| 324/323 |
| 7,038,456 | B2 | * | 5/2006  | Ellingsrud et al.| 324/334 |
| 2006/0197532 | A1 | * | 9/2006  | Eidesmo et al. | 324/334 |
| 2006/0238200 | A1 | * | 10/2006 | Johnstad       | 324/337 |

* cited by examiner

*Primary Examiner*—Donald E McElheny, Jr.
(74) *Attorney, Agent, or Firm*—Samuel S. Lee

(57) ABSTRACT

A method of seismo electromagnetic detecting of hydrocarbon deposits has the steps of simultaneously initiating an electromagnetic field and a seismic wave in investigated geological region so that an electromagnetic signal originates by vibrating of hydrocarbon deposit surface excited by the electromagnetic field and travels from the surface, recording the electromagnetic signal together with transient electromagnetic process in the region, and making a conclusion about a hydrocarbon deposit based on the recorded electromagnetic sign together with the transient electromagnetic process.

12 Claims, 3 Drawing Sheets

METHOD OF SEISMO ELECTROMAGNETIC DETECTING OF HYDROCARBON DEPOSITS

BACKGROUND OF THE INVENTION

The present invention relates to a method of detecting of hydrocarbon deposits.

Methods of detecting hydrocarbons are known. One of such methods which is based on the use of a transient electromagnetic field is disclosed in A. Hordt, P. Andrieux, F. M. Neubauer, H. Ruter, and K. Vozoff, 2000, A first attempt at monitoring underground gas storage by means of time-lapse multichannel transient electromagnetics: Geophysical Prospecting, 48, 489-509.

In accordance with this method a pulse electromagnetic field is excited on the earth surface and penetrates into the earth reaching great depths. The transient electromagnetic process which is registered on the surface reflects an inner structure of the radiating object. However, the detection of productive deposits of hydrocarbons in this method is not sufficiently reliable, since the physical nature of the transient electromagnetic process is not specific during location of high-ohmic collectors. The application of this method for many years showed its low efficiency for detection of deposits of oil and gas. Another method of detection of hydrocarbons based on a seismo electric effect is disclosed in U.S. Pat. No. 4,904,942 to Thompson. In accordance with this method a seismic pulse is excited on the earth surface so that a seismic wave crosses the depths with investigating object and an electromagnetic field resulting from a seismo electric effect in the investigated object reaches the earth surface and measures as an integrator of the presence of this object.

Other investigators of the seismo electric method for detection of oil and gas use the same concept as Thompson. Experiments conducted in this way and disclosed in the publication A. H. Thompson and G. A. Gist, 1993, Geophysical applications of electrokinetic conversion: The Leading Edge, 12, No. 12, 1169-1173. M. W. Haartsen, and R. P. Pride, 1997, Electroseismic waves from point sources in layered media: Journal of Geophysical Research, Vol. 102, No. B11 24745-24769; S. Garambois and M. Dietrich, 2001, Seismoelectric wave conversions in porous media; Field measurements and transfer function analysis: Geophysics Vol. 66, No3, 1417-1430 showed that the reached depths of investigation with this method does not increase 300 m. Therefore the above mentioned methods have very little practical value or no value at all.

Because of low efficiency of the data obtained during detecting of deposits of hydrocarbons with the existing geophysical methods, the seismic method, the coefficient of success of drilling does not exceed 10%.

SUMMARY OF THE INVENTION

Accordingly, it is an object of the present invention to provide a new method of detecting of hydrocarbon deposits, which is a further improvement of the existing methods.

In keeping with these objects and with others which will become apparent hereinafter, one feature of the present invention resides, briefly stated, in a method of seismo electromagnetic detecting of hydrocarbon deposits, comprising the steps of simultaneously initiating an electromagnetic field and a seismic wave in investigated geological region so that an electromagnetic signal originates by vibrating of hydrocarbon deposit surface excited by said electromagnetic field and travels from said surface; recording said electromagnetic signal together with transient electromagnetic process in said region; and making a conclusion about a hydrocarbon deposit based on said recorded electromagnetic signal together with said transient electromagnetic process.

The method in accordance with the present invention is based on an experimentally determined fact that a surface of a layer with hydrocarbons, on which an electromagnetic field and a seismo wave act simultaneously (binary radiation) or with a small delay generates a specific electromagnetic response, which is detected by a receiving device. This response was obtained in an experiment with the depth of a productive layer of gas 5 km and with its capacity 10 m. This shows a high efficiency of the proposed method.

In accordance with another feature of the present invention, said making a conclusion includes calculating the electromagnetic signal originated by the hydrocarbon deposit as a difference between said electromagnetic signal recorded together with said transient electromagnetic process and the transient electromagnetic process only recorded without said seismic wave initiating.

In accordance with still another feature of the present invention, initiating of said electromagnetic field and said seismic wave is performed with a time delay up to +/−3 seconds.

In accordance with still another feature of the present invention depth scanning of the region is performed by changing said time delay.

In accordance with still another feature of the present invention said electromagnetic field and said seismic wave initiating are carried out at or near an earth's surface, or at a down-hole location from inside a well penetrating substantially beneath an earth's surface, or at or near a sea surface, at or near a sea bottom.

In accordance with still another feature of the present invention said electromagnetic field is produced by an electromagnetic source, while said seismic wave initiating is carried out by a seismic source.

In accordance with still another feature of the present invention electrically detecting said electromagnetic field, or magnetically detecting said electromagnetic field is performed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A method of seismo electromagnetic detecting of hydrocarbon deposits includes a simultaneous action of an electromagnetic field and a seismic wave on a surface of a layer with hydrocarbons for a certain time. The simultaneous action of the electromagnetic wave and the seismic wave on the surface of the layer is identified in the present application as a binary irradiation of an investigated object.

Figure 1:
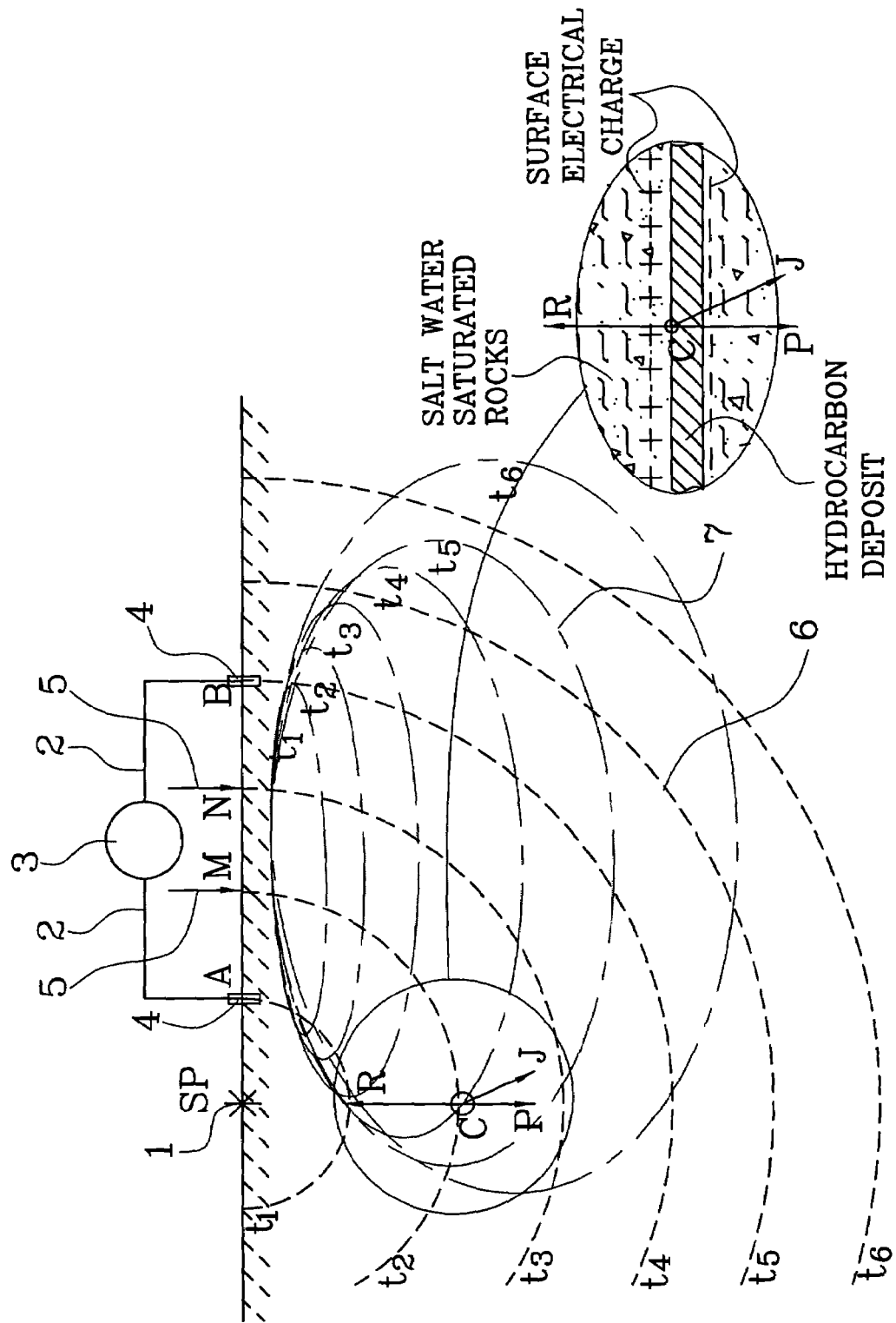
FIG. 1 is a view showing a transverse cross-section of a typical time distribution of a seismic wave and an electromagnetic field in a geological medium with illustration of main elements of a preferred embodiment of the method in accordance with the present invention.

As can be seen from FIG. 1, the seismic wave and the electromagnetic field are excited on the earth surface. However, it is possible to perform this in other conditions, for example in a sea or in a well. The seismic wave is excited in the point SP (shot point) and propagates downwardly as illustrated by short dash lines so as to penetrate rocks. Simultaneously in the medium a transient process (TP) of the electromagnetic field is excited by means of a current pulse. The current pulse can be generated by a source 3 in a cable 2 which is grounded in the points AB where grounding elements 4 are arranged.

The induced electromagnetic transient process in the medium propagates downwardly as identified with long dash lines with a speed that depends on specific electrical resistance of the medium and its dielectric permeability. The speed of propagation of the transient process is usually greater than a speed of propagation of the seismic wave. The time of propagation of the transient process and the seismic wave is indicated with $t_i$.

Assume that in a vicinity of the point C a surface of the layer with hydrocarbons is located, and the seismic wave with a pressure gradient P and electromagnetic field with a current density J reached this surface almost simultaneously, or the seismic wave reached it with some delay.

It is known that during passage of an electrical field through a border between two media with different specific resistance, on the border a surface density of an electrical charge is produced with a magnitude that is proportional to a specific electrical resistance of a high-ohmic medium, which medium in the inventive method is a hydrocarbon-containing layer. It is also known that the seismic wave causes a shift of a liquid phase of a productive collector relative to a hard skeleton. This shift will cause distraction of a layer of the surface density of the electrical charge, induced by the primary electromagnetic field. A fast disappearance of the surface charge generates a response signal R. The response signal R reaches to the surface and is a reliable indicator of the presence of a concentration of hydrocarbons. Receiving electrodes 5 can be used as detectors of these signals.

Other geological media do not have properties, which are analogous to the above mentioned properties, namely a high-ohmic layer with a high porosity and permeability. Therefore the response signals from hydrocarbon deposits are specific.

The same process can be carried on a sea surface, near a sea bottom, or in a well.

Figure 2:
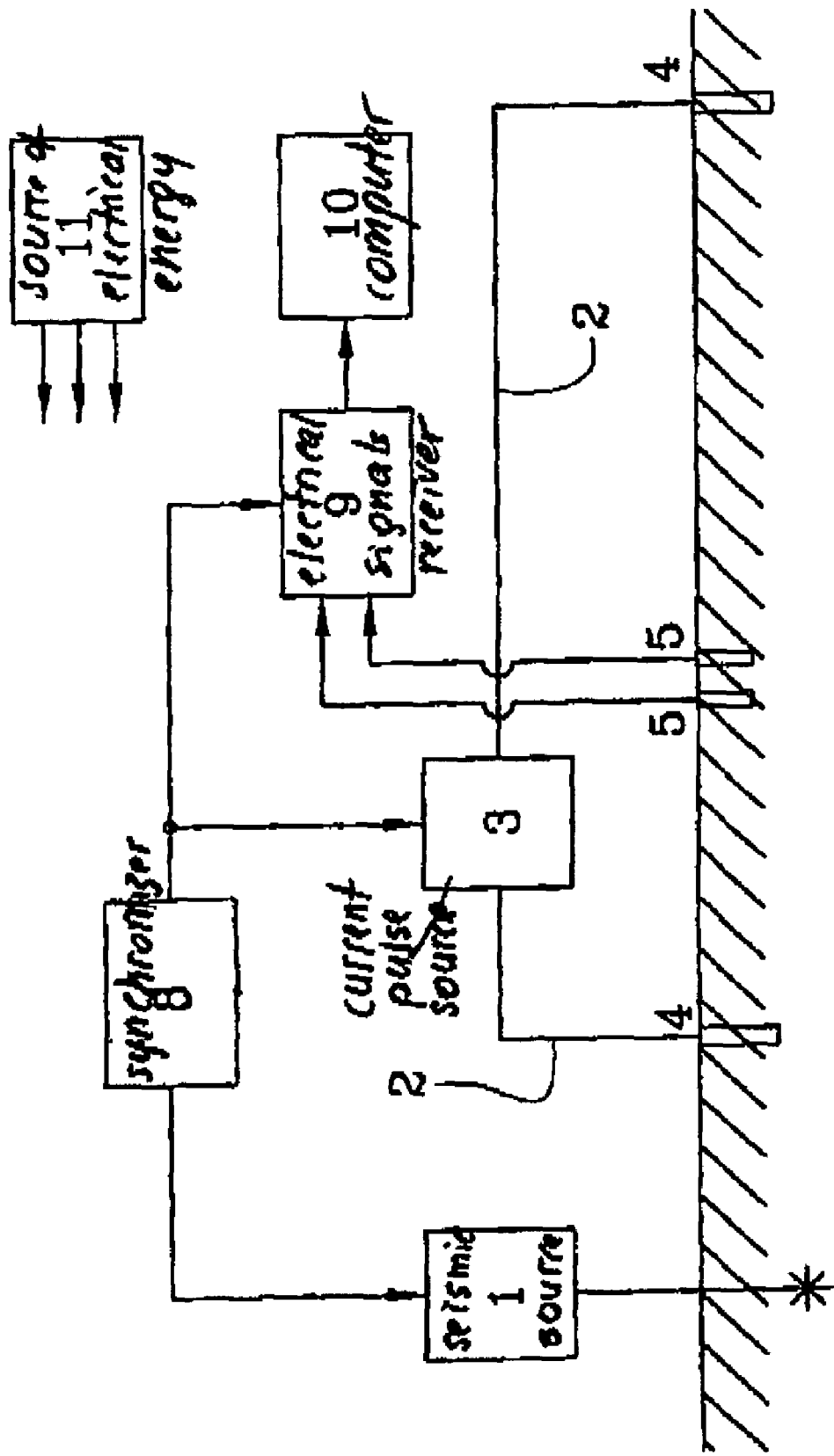
FIG. 2 is a view showing a block diagram of implementation of a method in accordance with the present invention.

FIG. 2 illustrates a preferable realization of the method of binary radiation from the earth's surface. In this figure reference numeral 1 identifies a seismic source of any design, for example sparker or airgun, while 3 identifies a generator of electric pulses whose output is connected with grounding elements 4 by a cable 2 or with an antenna of any design, for example by a non-grounded loop. A receiver of electrical signals for example a digital microvoltmeter is identified with reference numeral 9. A personal computer 10 is connected with an output of the microvoltmeter. A synchronizer 8 provides a timely turning on of the seismic source, the generator of electrical pulses, and the microvoltmeter. A source of electrical energy 11 provides power supply to all blocks. Electrical sensors 5 are used, and formed for example as receiving electrodes for measurements of an electrical field, or magnetical sensors are used for measurements of a magnetic component of the field.

When all elements shown in FIG. 2 are connected, the synchronizer 5 sends a signal to turn on the seismic source 1, the pulse generator 2 and the microvoltmeter 3. The turning on of the pulse generator can be delayed for substantially 3 seconds, if it is necessary to carry out scanning of the investigating area over depth. This possibility is provided because the electromagnetic field propagates in general faster than the seismic wave. It is possible to select the delay so that the seismic wave and the electromagnetic transient process will reach the desired depth simultaneously. In this case the deposits located in an upper part of the medium will not be activated before passage of the seismic wave for generating a response, and the obtained signals will be connected only to deeper deposits.

On the other hand, the turning on of the generator can be carried out before the turning on of the seismic source by substantially three seconds. In this case the investigated area of the earth will be uniformly illuminated by the electromagnetic field, and the seismic wave will initiate a response from the deposit at any depth of its location. Therefore the binary radiation allows to study the investigated objects in a more detailed fashion.

The response which is initiated in the deposit propagates upwardly and is detected by the sensors 5. The electrical signal of the response is supplied to the input of the receiver and then is supplied into the personal computer, where it is processed and stored. A geometrical location of the sources of the electromagnetic field, sources of seismic waves and electromagnetic sensors is selected based on the geological conditions of carrying out of the investigating works. The number of the sources and the receivers can be arbitrary, and is selected for economical considerations.

Figure 3:
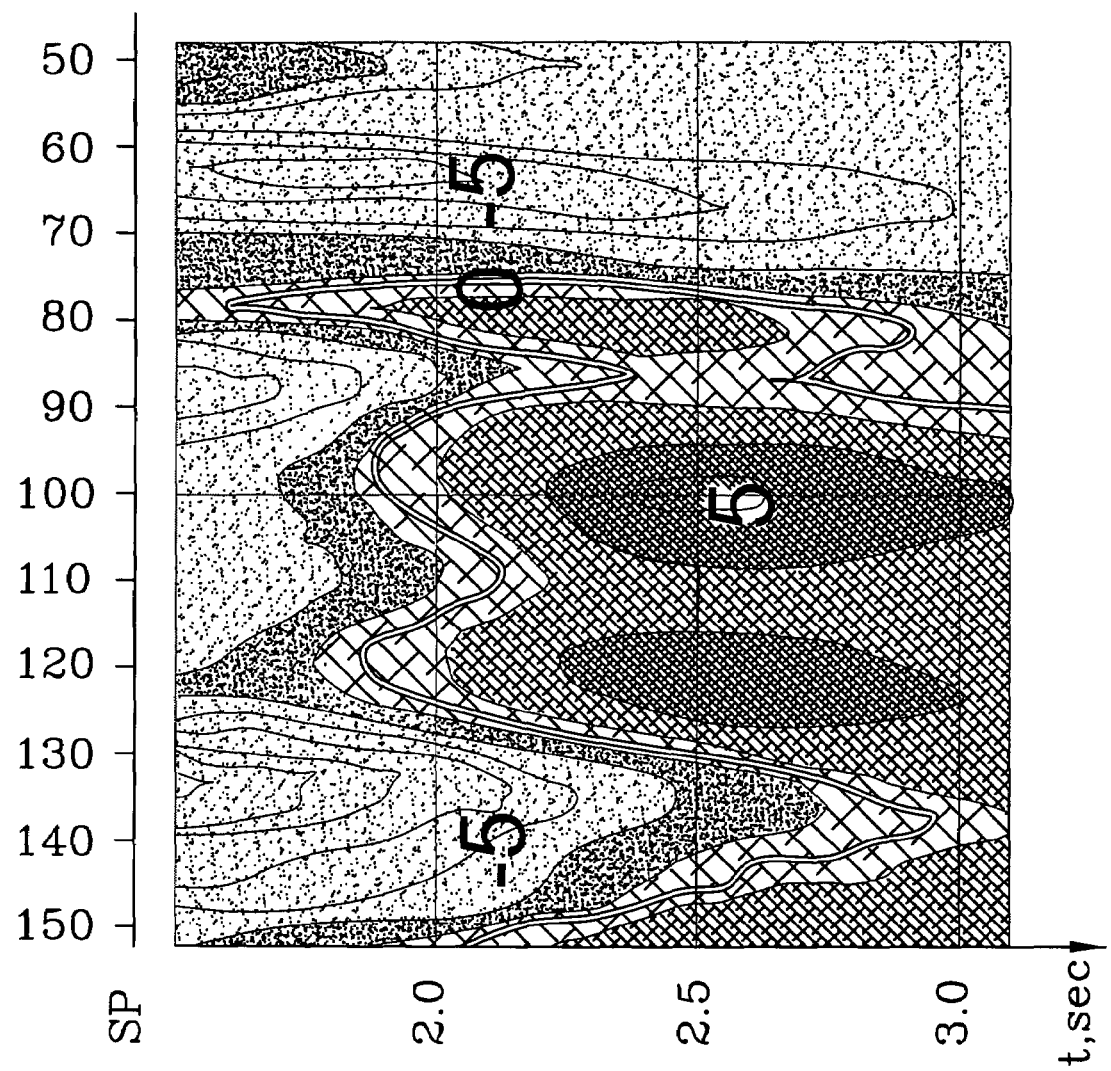
FIG. 3 is a view showing an example of a distribution of a response from a deposit in a geological medium.

It is to be clear that the systems of observation can be two-dimensional or three-dimensional. An example of distribution of amplitudes of the response signal in microvolts along a profile of detection above the above mentioned deposit with a capacity 10 m at the depth 5 km is shown in FIG. 3. The maximum amplitude of the response with the magnitude 5.0 microvolts (dark spot) is observed at the times of 2.5 seconds. This corresponds to the above mentioned deposit at the depths of 5 km.

It will be understood that each of the elements described above, or two or more together, may also find a useful application in other types of methods differing from the types described above.

While the invention has been illustrated and described as embodied in a method of seismo electromagnetic detecting of hydrocarbon deposits, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method of seismo electromagnetic detecting of hydrocarbon deposits, comprising the steps of simultaneously initiating an electromagnetic field and a seismic wave in investigated geological region so that an electromagnetic signal originates by vibrating of hydrocarbon deposit surface excited by said electromagnetic field and travels from said surface; recording said electromagnetic signal together with transient electromagnetic process in said region; and making a conclusion about a hydrocarbon deposit based on said recorded electromagnetic signal together with said transient electromagnetic process, said making the conclusion including determining that the hydrocarbon deposit is present when the electromagnetic signal is recorded with said transient electromagnetic process and and determining that the hydrocarbon deposit is absent when the electromagnetic signal is not recorded with said transient electromagnetic process.

2. A method as defined in claim 1, wherein said making a conclusion includes calculating the electromagnetic signal originated by the hydrocarbon deposit as a difference between said electromagnetic signal recorded together with said transient electromagnetic process and the transient electromagnetic process only recorded without said seismic wave initiating.

3. A method as defined in claim 1; and further performing initiating of said electromagnetic field and said seismic wave with a time delay up to +/−3 seconds.

4. A method as defined in claim 3; and further comprising depth scanning of the region by changing said time delay.

5. A method as defined in claim 1; and further comprising carrying out said electromagnetic field and said seismic wave initiating at or near an earth's surface.

6. A method as defined in claim 1; and further comprising carrying out said electromagnetic field and said seismic wave initiating at a down-hole location from inside a well penetrating substantially beneath an earth's surface.

7. A method as defined in claim 1; and further comprising carrying out said electromagnetic field and said seismic wave initiating at or near a sea surface.

8. A method as defined in claim 1; and further comprising carrying out said initiating and said recording of said electromagnetic field at or near a sea bottom.

9. A method as defined in claim 1; and further comprising producing said electromagnetic field by an electromagnetic source.

10. A method as defined in claim 1; and further comprising carrying out said seismic wave initiating by a seismic source.

11. A method as defined in claim 1; and further comprising electrically detecting said electromagnetic field.

12. A method as defined in claim 1; and further comprising magnetically detecting said electromagnetic field.

* * * * *